(12) United States Patent  (10) Patent No.: US 8,441,628 B2
Mitsuhashi  (45) Date of Patent: May 14, 2013

(54) APPARATUS FOR INSPECTING AN ILLUMINATION DEVICE

(75) Inventor: Junichi Mitsuhashi, Isumi (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 13/325,095

(22) Filed: Dec. 14, 2011

(65) Prior Publication Data

US 2012/0147365 A1 Jun. 14, 2012

(30) Foreign Application Priority Data

Dec. 14, 2010 (JP) ................................. 2010-278267

(51) Int. Cl.
  *G01N 21/89* (2006.01)
(52) U.S. Cl.
  USPC ...................................................... 356/239.1
(58) Field of Classification Search ........................ None
  See application file for complete search history.

(56) References Cited

U.S. PATENT DOCUMENTS 7,695,780 B2 * 4/2010 Ohgaru et al. ............... 428/1.31
7,808,630 B2 * 10/2010 Shin .......................... 356/239.1

FOREIGN PATENT DOCUMENTS

JP 2001-318357 11/2001

* cited by examiner

*Primary Examiner* — Tu Nguyen
(74) *Attorney, Agent, or Firm* — Antonelli, Terry, Stout & Kraus, LLP.

(57) ABSTRACT

The present invention provides an apparatus for inspecting an illumination device where the illumination device allows light from one or more light sources to be emitted to the outside through a number of optical sheets layered on top of each other. The apparatus is provided with: a work stage on which an illumination device is placed; a work frame for fixing the position of the illumination device placed on the work stage; and a pressure reducing apparatus for making the pressure in the space inside the illumination device lower than the pressure in the space outside the apparatus for inspecting an illumination device when turned on during the inspection, wherein the work frame has an opening through which light from the illumination device is emitted and makes contact with the outer periphery of the illumination device and the work stage, respectively, through annular form during the inspection.

3 Claims, 7 Drawing Sheets

APPARATUS FOR INSPECTING AN ILLUMINATION DEVICE

CROSS-REFERENCE TO RELATED APPLICATION

The present application claims priority over Japanese application JP 2010-278267 filed on Dec. 14, 2010, the contents of which are hereby incorporated into this application by reference.

BACKGROUND OF THE INVENTION (1) Field of the Invention

The present invention relates to an apparatus for inspecting an illumination device, and in particular, to a technology that is effective when applied to an apparatus for inspecting a backlight used in a liquid crystal display device when turned on.

(2) Description of the Related Art

Some liquid crystal display devices have an illumination device, which is referred to as a backlight, provided behind the liquid crystal display panel (at the rear).

The backlights convert light emitted from a light source, such as LEDs or a fluorescent lamp, into rays emitted from an area so that the liquid crystal display panel can be illuminated, and various structures of backlights are known. In addition, backlights are usually formed of a number of optical sheets that are layered on top of each other in order to increase the degree of symmetry of the rays from an area (uniformity of the brightness in an area) or the efficiency of the use of light for illuminating the liquid crystal display panel, for example. These optical sheets include a prism sheet, a light diffusing sheet and the like, and a combination of these is determined by the type of or the way of arranging the light source, the properties required for the liquid crystal display device and the like.

The backlights used for a liquid crystal display device are usually inspected when turned on before they are combined with a liquid crystal display panel. Through this inspection when turned on, the degree of symmetry of the rays from an area (uniformity in the brightness of an area) and whether or not any foreign substance is between the optical sheets are checked. Such an inspection when turned on may be carried out on a backlight to which a light source has already been attached by turning on the light source or may be carried out on a backlight to which a light source has not yet been attached by temporarily attaching a light source for inspection.

SUMMARY OF THE INVENTION

Conventional inspection of a backlight when turned on is carried out by placing a backlight on top of a worktable for inspection, which is referred to as a work stage, and turning on the light source. In accordance with most conventional inspection methods (in most conventional inspection apparatuses), a backlight is simply fixed in a predetermined location on top of a workstation.

As described above, however, backlights have such a structure where a number of optical sheets are layered on top of each other and each optical sheet is very thin, and the thickness thereof ranges from several tens of μm to several hundreds of μm. Therefore, the optical sheets in the backlight easily bend. In addition, the bending of an optical sheet is peculiar to the optical sheet and independent, and thus does not relate to the bending of other optical sheets.

Accordingly, in the case where a backlight of which the optical sheets bend is inspected when turned on in a conventional inspection apparatus, the optical sheets that are layered on top of each other do not make close contact, which makes the outline of a foreign substance between optical sheets obscure, and thus such a problem arises that it is difficult to detect the foreign substance.

An object of the present invention is to provide an apparatus for inspecting a backlight when turned on where a foreign substance between optical sheets can be easily detected when the backlight used for a liquid crystal display device is inspected when turned on, for example.

The above-described and other objects and novel features of the present invention will be clarified by the descriptions of the present specification and the accompanying drawings.

Typical inventions disclosed in the present application can be outlined as follows.

(1) An apparatus for inspecting an illumination device, the illumination device allowing light to be emitted from one or more light sources to the outside through a number of optical sheets that are layered on top of each other, having; a work stage on which an illumination device is placed; a work frame for fixing the position of the illumination device placed on the work stage; and a pressure reducing apparatus for making the pressure in the space inside the illumination device lower than the pressure in the space outside the apparatus for inspecting an illumination device when turned on during the inspection, wherein the above-described work frame has an opening through which light from the illumination device is emitted and makes contact with the outer periphery of the illumination device and the above-described work stage, respectively, through annular form during the above-described inspection.

(2) The apparatus for inspecting an illumination device according to the above (1), wherein the illumination device does not have a light source at the time of the above-described inspection, and one or more light sources are attached to the above-described work stage.

(3) The apparatus for inspecting an illumination device according to the above (1), wherein the illumination device does not have a light source at the time of the above-described inspection, and one or more light sources are attached to the above-described work frame.

According to the present invention, a foreign substance between optical sheets can be easily detected through the inspection of the illumination device when turned on even in the case where the optical sheets that are layered on top of each other bend.

DESCRIPTION OF THE EMBODIMENTS

In the following, the embodiments of the present invention are described in detail in reference to the drawings. Here, the same symbols are attached to the components having the same functions throughout the figures showing the embodiments, and the descriptions thereof are not repeated.

[First Embodiment]

Figure 1A:
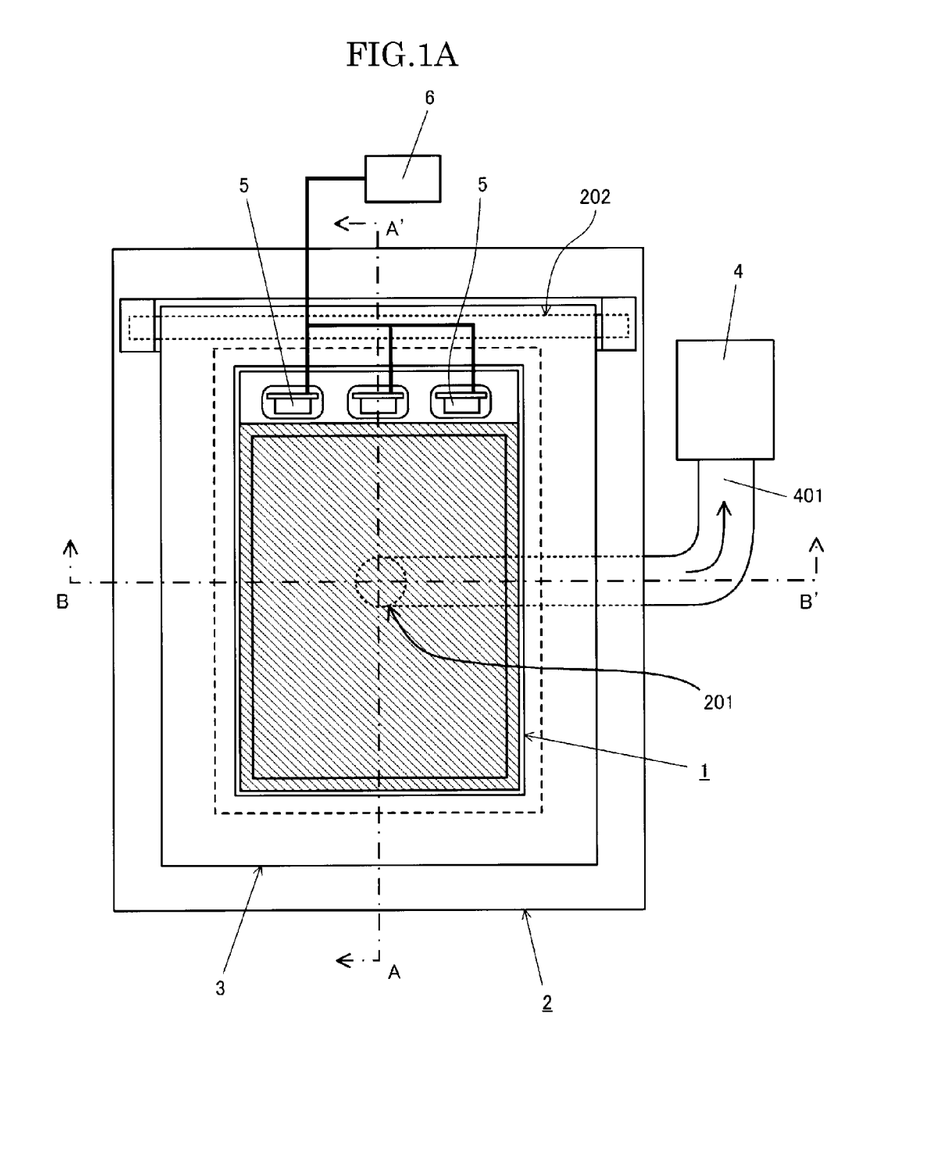
FIG. 1A is a schematic front diagram showing an example of the structure of a main portion in the apparatus for inspecting an illumination device when turned on according to the first embodiment.
Figure 1B:
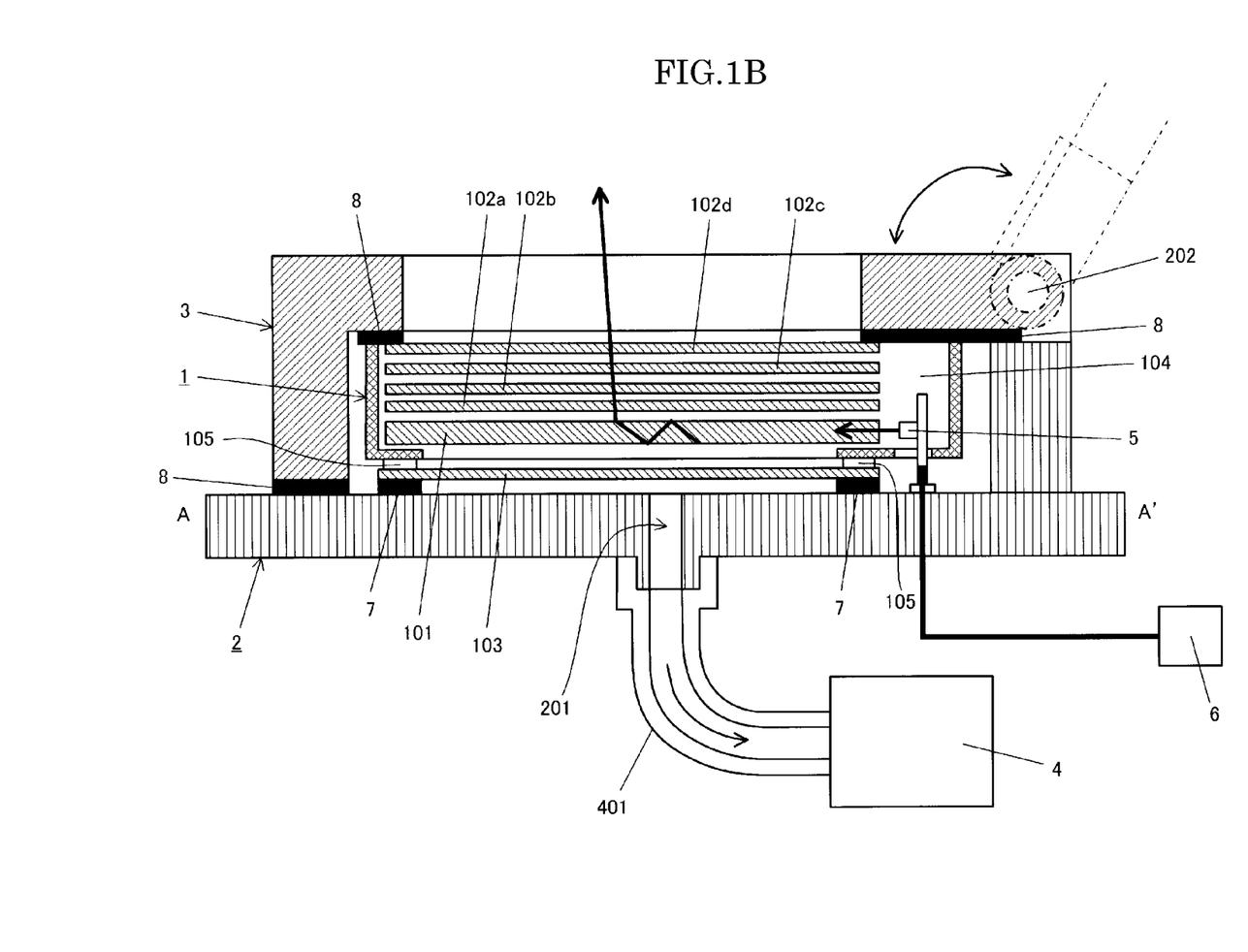
FIG. 1B is a schematic cross-sectional diagram along line A-A' in FIG. 1A showing an example of the structure.
Figure 1C:
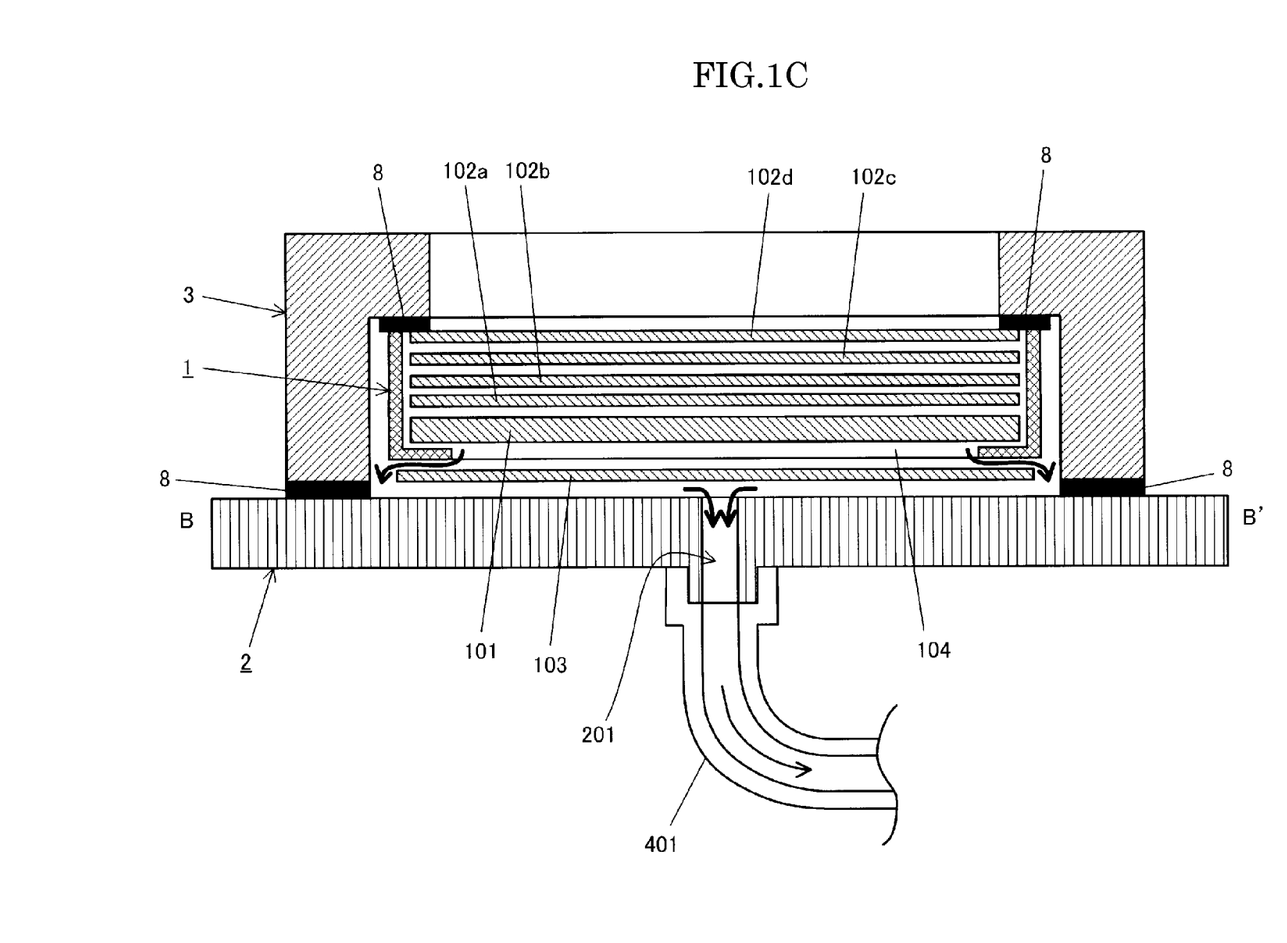
FIG. 1C is a schematic cross-sectional diagram along line B-B' in FIG. 1A showing an example of the structure.

FIGS. 1A to 1C are schematic diagrams showing an example of the structure of the apparatus for inspecting an illumination device when turned on according to the first embodiment of the present invention.

FIG. 1A is a schematic front diagram showing an example of the structure of a main portion in the apparatus for inspecting an illumination device when turned on according to the first embodiment. FIG. 1B is a schematic cross-sectional diagram along line A-A' in FIG. 1A showing an example of the structure. FIG. 1C is a schematic cross-sectional diagram along line B-B' in FIG. 1A showing an example of the structure;

An example of the structure and the working effects of an apparatus for inspecting a light guide plate type backlight (also referred to as edge light type backlight) when turned on are described according to the first embodiment. In addition, in the backlight according to the first embodiment, the light source, such as LEDs, is not yet attached during the inspection.

As shown in FIGS. 1A and 1B, the apparatus for inspecting a backlight when turned on according to the first embodiment has: a work stage 2 on which the backlight 1 to be inspected is placed; a work frame 3 for fixing the position of the backlight 1 placed on the work stage 2; a pressure reducing apparatus 4 for making the pressure in the space within the backlight 1 lower than the pressure in the space outside the apparatus for inspecting a backlight when turned on during the inspection; and a light source 5 to be turned on for inspection and the power 6 for turning on the light.

The light guide plate type backlight 1 has a light guide plate 101, a number of optical sheets (102a to 102d) layered on top of each other, and a reflecting sheet 103, which are integrally held by a frame member 104. It is possible to change the types and the number of optical sheets, and any combination of appropriate optical sheets in a conventional backlight 1 may be used. FIGS. 1B and 1C show a case where four optical sheets are layered on top of each other as an example of a combination of a number of optical sheets, where a first light diffusing sheet 102a, a first prism sheet 102b, a second prism sheet 102c and a second light diffusing sheet 102d are layered in this order close to the light guide plate 101.

In addition, a reflecting sheet 103 is provided on the side of the light guide plate 101 opposite to the side on which the optical sheets (102a to 102d) are provided. Here, FIGS. 1B and 1C show a case where an opening is provided in a region of the bottom of the frame member 104 in which the light guide plate 101 is provided, and the reflecting sheet 103 is pasted to the frame member 104 using an adhesive material 105 so as to cover the opening.

Examples and the working effects of the light guide plate 104, the optical sheets (102a to 102d), the reflecting sheet 103 and the frame member 104 in the backlight 1 are known, and therefore the descriptions of these are omitted in the present specification.

The backlight 1 is placed on the work stage 2, and a through hole 201 that penetrates from the side on which the backlight 1 is placed to the opposite side is provided in the region in which the backlight 1 is placed. An air suction pipe 401 of the pressure reducing apparatus 4 is connected to this through hole 201. Here, the backlight 1 is placed on the work stage 2 so that the surface on which the reflecting sheet 103 is provided (in other words, the surface on the side opposite to the direction in which the light from the light source is emitted) faces the work stage 2. In addition, the backlight 1 is placed in such a manner that the first cushion material 7 provided to the work stage 2, for example, prevents the reflecting sheet 103 and the work stage 2 from making direct contact. Here, simple protrusions may be provided on the surface of the work stage 2 instead of the first cushion material 7, for example.

The work frame 3 has an opening for a region through which light from the backlight 1 is emitted and has such a form as to make contact with the outer periphery of the backlight 1 and the work stage 2, respectively, through an annular portion during the time of inspection when the backlight is turned on. Here, the contact between the work frame 3 and the backlight 1 as well as the contact between the work frame 3 and the work stage 2 are respectively intervened by a second cushion material 8, for example. As a result, the space inside the backlight 1 during the time of inspection when the backlight is turned on is in such a state that it is almost shielded from the space outside the apparatus for inspecting a backlight when turned on. In addition, the work frame 3 and the work stage 2 are connected through a shaft 202, as shown in FIGS. 1A and 1B, and thus the work frame 3 has such a structure as being movable with the shaft 202 as a rotational axis.

The pressure reducing apparatus 4 may be an apparatus that can inhale the air from the space in which the backlight 1 is placed through the air suction pipe 401 and the through hole 201 in the work stage 2, and may be a vacuum pump, for example.

It is preferable for the light source 5 to have the same properties as the light source that is used when the liquid crystal display device into which the backlight 1 is incorporated is used. FIGS. 1A and 1B show a case where LEDs (light emitting diodes) are used as the light source 5. At this time, the light source 5 is connected to the power 6 for turning on the light through a printed circuit board and wires (cables). In addition, the printed circuit board is installed on (fixed to) the work stage 2, and the light source 5 is provided in such a location as to correspond to the surface of the light guide plate 101 through which light is introduced through the opening provided at the bottom of the frame member 104 in the backlight 1.

The procedure for carrying out the inspection on the backlight 1 when turned on using the apparatus for inspecting a backlight when turned on according to the first embodiment is as follows.

First, the work frame 3 is rotated and the backlight 1 is mounted on the work stage 2. Next, the work frame 3 is returned so that the work frame 3 and the work stage 2 fix the position of the backlight 1.

Next, the pressure reducing apparatus 4 is operated. At this time, there is a gap between the bottom of the frame member 104 in the backlight 1 and the reflecting sheet 103 as shown in FIG. 1C, for example. Therefore, when the pressure reducing apparatus 4 is operated to start sucking air, the air in the space inside the backlight 1 is sucked through the gap between the frame member 104 and the reflecting sheet 103. In addition, the contact between the outer periphery of the backlight 1 and the work frame 3 as well as the contact between the work stage 2 and the work frame 3 are respectively intervened with the second cushion material 8, and therefore almost no air flows into the space inside the backlight 1 from the outside of the apparatus for inspecting a backlight when turned on through these contacts. Accordingly, when the pressure reducing apparatus 4 is operated, the pressure in the space inside the backlight 1 is lower than the pressure in the space outside the apparatus for inspecting a backlight when turned on (usually the air pressure).

Next, the power supplied from the power source 6 for turning on the light makes the light source 5 emit light, and the state of the light that has been emitted through the light guide plate 101 and the optical sheets (102a to 102d) is inspected (observed).

When the inspection is completed, the light source 5 is turned on and the pressure reducing apparatus 4 is stopped, and after that, the backlight 1 is taken out.

Figure 2A:
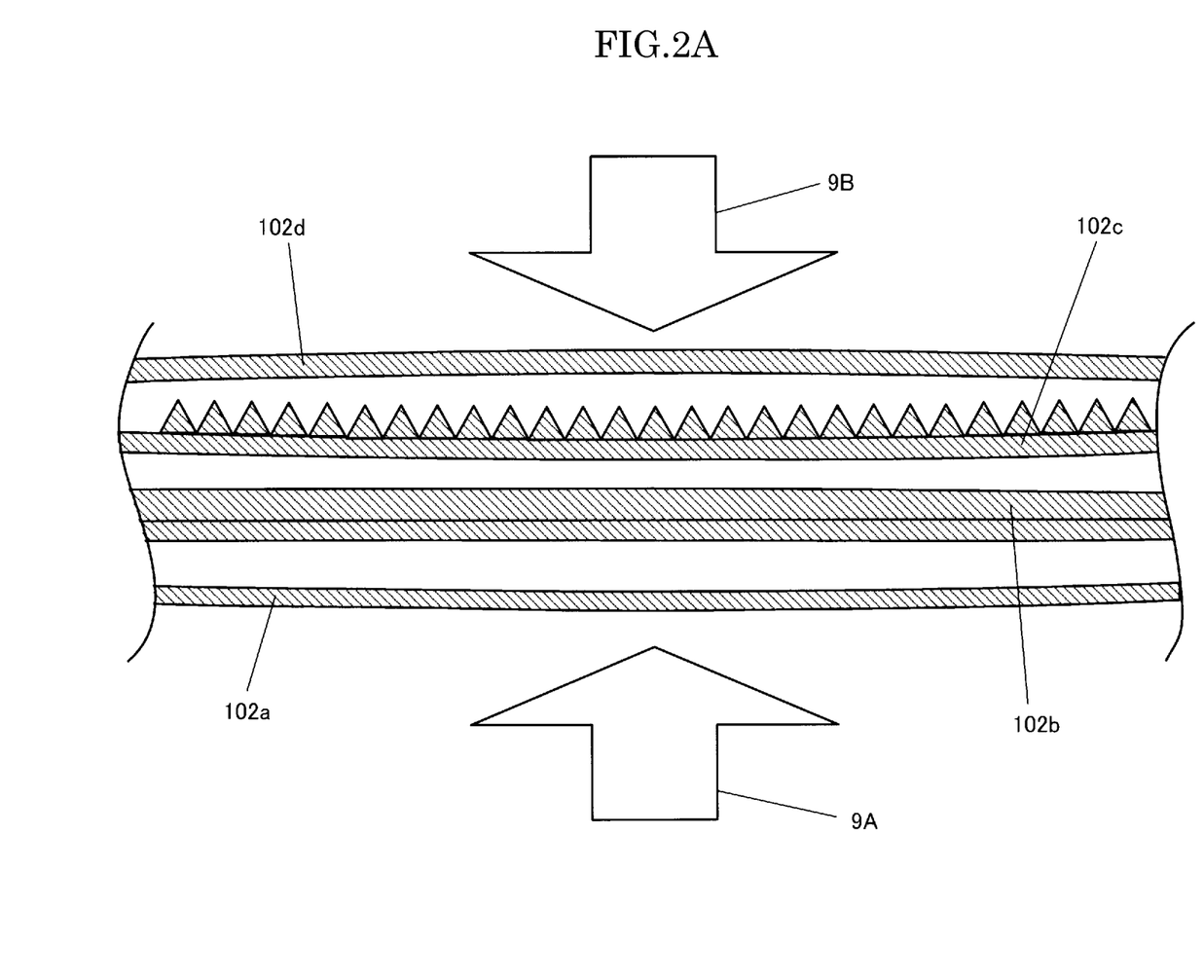
FIG. 2A is a schematic cross-sectional diagram showing an example of the structure of optical sheets before the pressure reducing apparatus is operated.
Figure 2B:
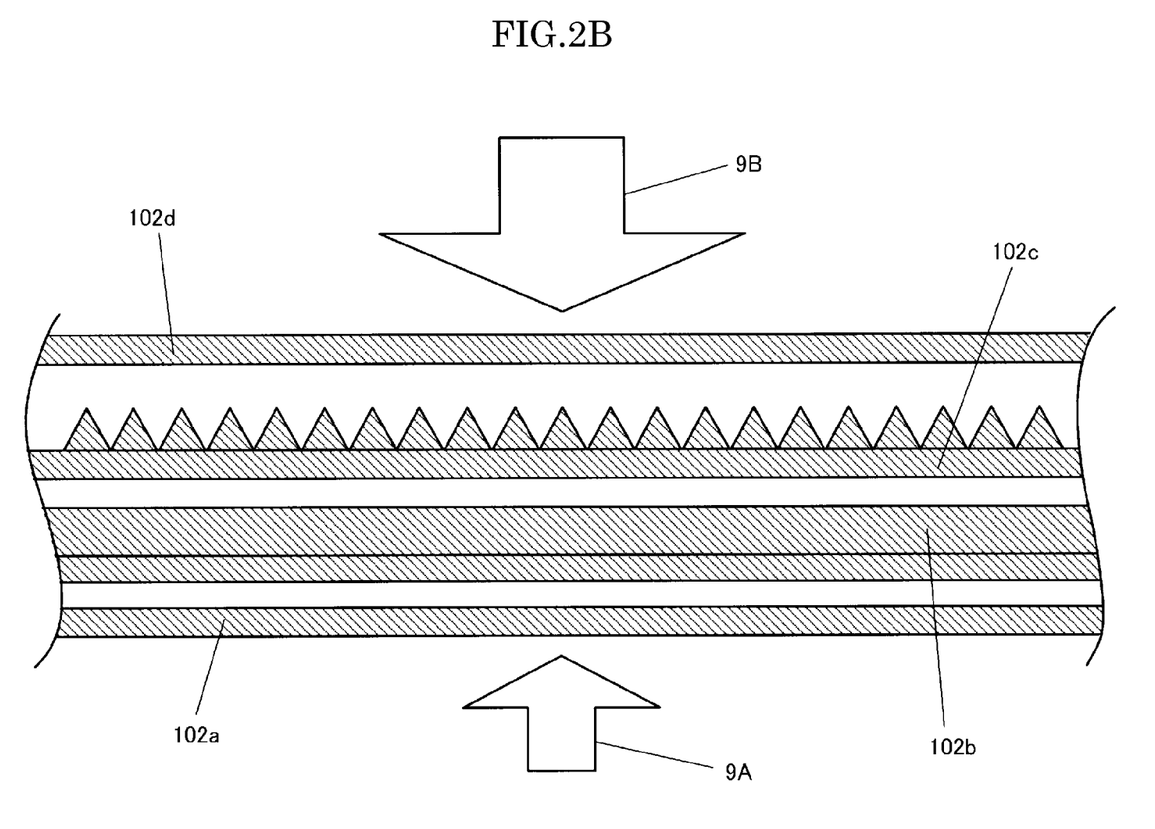
FIG. 2B is a schematic cross-sectional diagram showing an example of the structure of optical sheets when the pressure reducing apparatus is operated.

FIGS. 2A and 2B are schematic diagrams for illustrating the working effects of the apparatus for inspecting an illumination device when turned on according to the first embodiment.

FIG. 2A is a schematic cross-sectional diagram showing an example of the structure of optical sheets before the pressure reducing apparatus 4 is operated. FIG. 2B is a schematic cross-sectional diagram showing an example of the structure of optical sheets when the pressure reducing apparatus 4 is operated.

As described above, the optical sheets (102a to 102d) used in the backlight 1 are very thin and have a thickness ranging from several tens of μm to several hundreds of μm, and thus are easily bent. In addition, the bending of an optical sheet is peculiar to the optical sheet and independent, and thus does not relate to the bending of other optical sheets. That is to say, in many cases, the optical sheets (102a to 102d) in the backlight 1 before the inspection when the backlight is turned on are bent irregularly, as shown in FIG. 2A for example. In addition, before the inspection when the backlight is turned on and during the inspection when the backlight is turned on using a conventional apparatus for inspecting a backlight when turned on, the pressure 9A applied from the first light diffusing sheet 102a side and the pressure 9B applied from the second light diffusing sheet 102d side are approximately the same. Accordingly, the inspection when the backlight is turned on using a conventional apparatus for inspecting a backlight when turned on is carried out in such a state where the optical sheets (102a to 102d) are bent irregularly, as shown in FIG. 2A.

In the case where the backlight 1, where the optical sheets (102a to 102d) are irregularly bent, is inspected when turned on using a conventional apparatus for inspecting a backlight when turned on, the optical sheets that are layered on top of each other do not make close contact, which makes the outline of a foreign substance between optical sheets obscure. Therefore, the inspection using a conventional apparatus for inspecting a backlight when turned on has such a problem that it is difficult to detect such a foreign substance.

In contrast, the apparatus for inspecting a backlight when turned on according to the first embodiment uses a pressure reducing apparatus 4 that makes the pressure in the space inside the backlight 1 lower than the pressure in the space outside the apparatus for inspecting a backlight when turned on. That is to say, when the inspection is carried out when the backlight is turned on using the apparatus for inspecting a backlight when turned on according to the first embodiment, as shown in FIG. 2B for example, the pressure 9A applied from the first light diffusing sheet 102a side is lower than the pressure 9B applied from the second light diffusing sheet 102d side. At this time, due to the difference in the pressure applied to the respective optical sheets (102a to 102d), it is possible for a change to occur such that the optical sheets are bent towards the first light diffusing sheet 102a side. Therefore, even in the case where the respective optical sheets are irregularly bent and do not make close contact with each other before the inspection when the backlight is turned on, the optical sheets can make close contact by orienting the direction of the bending during the time of inspection when the backlight is turned on. Accordingly, the outline of a foreign substance between optical sheets can be made less obscure, and thus it becomes easier to detect the foreign substance.

As described above, the apparatus for inspecting a backlight when turned on according to the first embodiment can correct the irregular bending of each optical sheet due to the difference in the pressure, and thus can easily detect a foreign substance between optical sheets. Therefore, the time it takes to inspect one backlight can be shortened, and at the same time, the load during the time of inspection can be reduced. In addition, the yield can be prevented from lowering due to the oversight of a foreign substance.

[Second Embodiment]

Figure 3A:
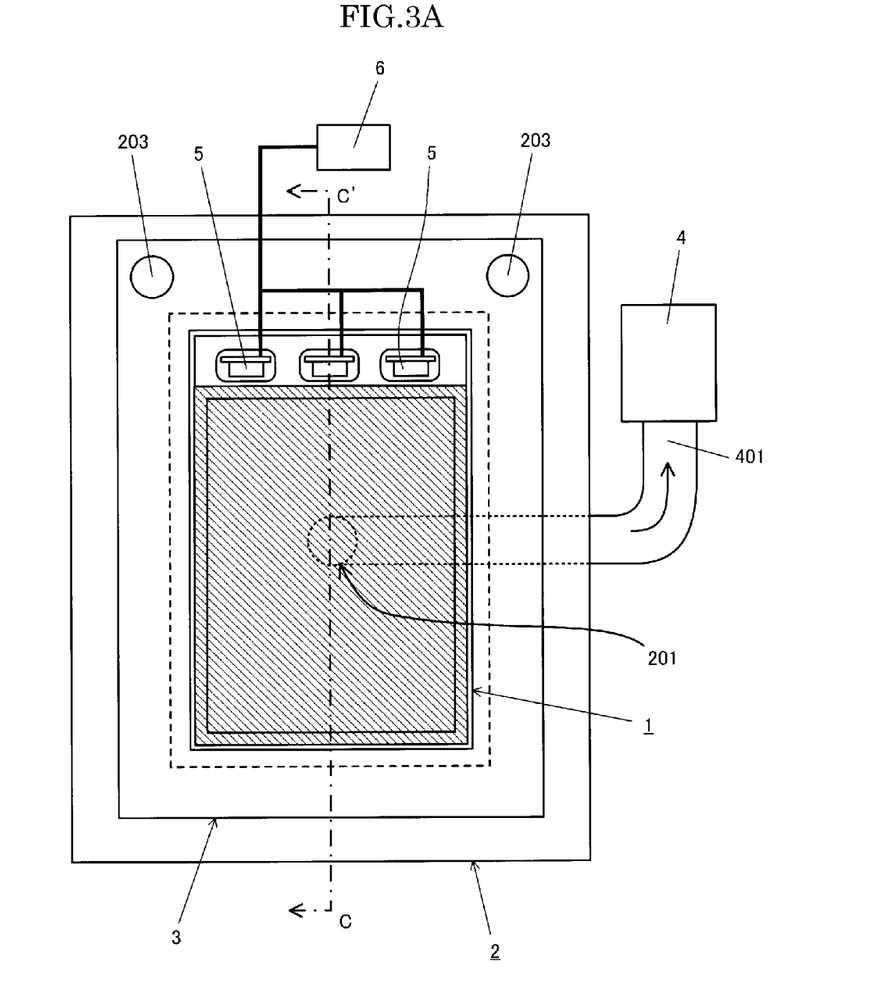
FIG. 3A is a schematic front diagram showing an example of the structure of a main portion in the apparatus for inspecting an illumination device when turned on according to the second embodiment.
Figure 3B:
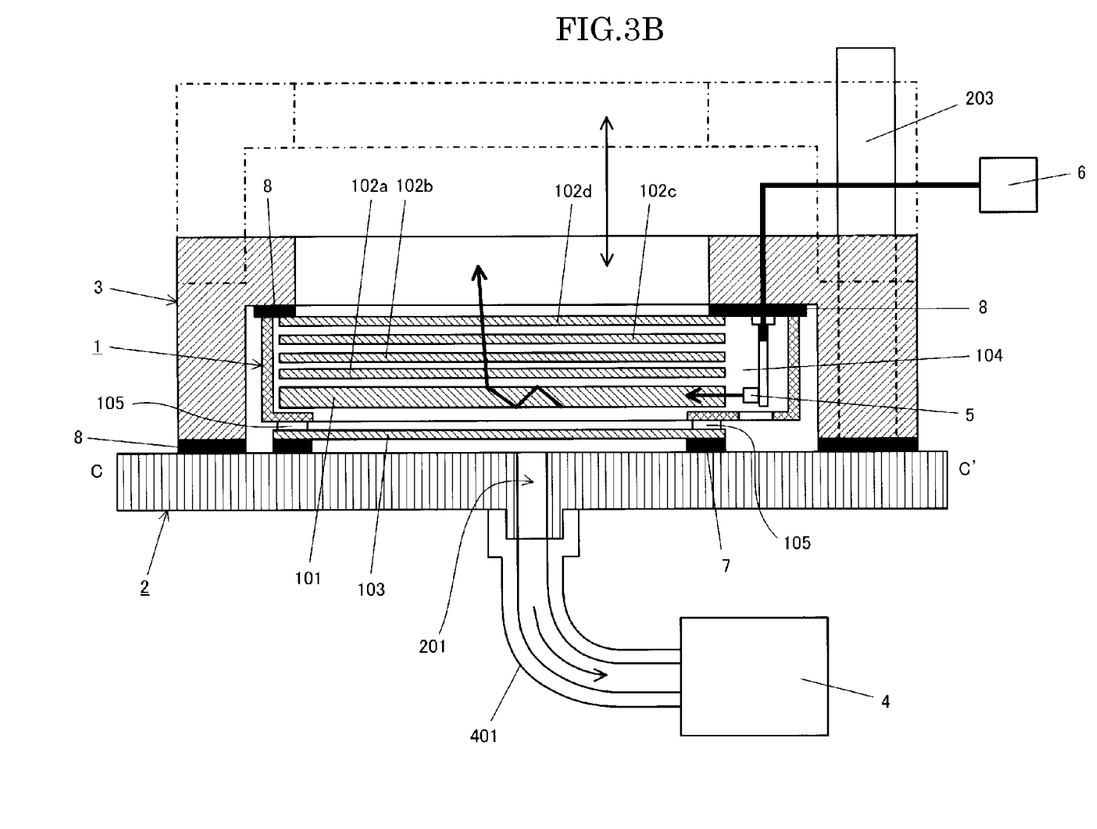
FIG. 3B is a schematic cross-sectional diagram along line C-C' in FIG. 3A showing an example of the structure.

FIGS. 3A and 3B are schematic diagrams showing an example of the structure of the apparatus for inspecting an illumination device when turned on according to the second embodiment of the present invention.

FIG. 3A is a schematic front diagram showing an example of the structure of a main portion in the apparatus for inspecting an illumination device when turned on according to the second embodiment. FIG. 3B is a schematic cross-sectional diagram along line C-C' in FIG. 3A showing an example of the structure.

In the second embodiment as well, the backlight to be inspected is a light guide plate type backlight 1 having four optical sheets (first light diffusing sheet 102a, first prism sheet 102b, second prism sheet 102c and second light diffusing sheet 102d) as in the first embodiment. In addition, when this backlight 1 is inspected when turned on, no light source, such as LEDs, has yet been attached.

As shown in FIGS. 3A and 3B, for example, the apparatus for inspecting a backlight when turned on according to the second embodiment has a work stage 2 on which the backlight 1 to be inspected is mounted, a work frame 3 to which the position of the backlight 1 mounted on the work stage 2 is secured, a pressure reducing apparatus 4 that makes the pressure in the space inside the backlight 1 lower than the pressure in the space outside the apparatus for inspecting a backlight when turned on, the light source 5 for the inspection when it is turned on, and the power 6 for turning on the light.

The apparatus for inspecting a backlight when turned on according to the second embodiment is different from the one in the first embodiment in that the light source 5 for inspection is installed on the work frame 3. In addition, the work frame 3 in the apparatus for inspecting a backlight when turned on in the second embodiment has such a structure that it uses a shaft 203 that extends vertically from the surface of the work stage 2 on which the backlight is mounted and moves upwards and downwards along the shaft 203. The mechanism for supporting the work frame 3 so that it is movable and the mechanism for fixing the work frame 3 can be modified if necessary, and therefore the descriptions of examples of concrete mechanisms are omitted.

The apparatus for inspecting a backlight when turned on according to the second embodiment is different from the one in the first embodiment in the mechanism for allowing the work frame 3 to be movable, but the two have the same structure in that the work frame 3 makes contact with the outer periphery of the backlight 1 and the work stage 2, respectively, through an annular form during the time of inspection when the backlight is turned on. In the second embodiment as well, the contact between the work frame 3 and the backlight 1 as well as the contact between the work frame 3 and the work stage 2 are respectively intervened with a second cushion material 8, for example, so as to provide such a state that the space inside the backlight 1 during the time of inspection when the backlight is turned on is almost shielded from the space outside the apparatus for inspecting a backlight when turned on. As a result, when the pressure reducing apparatus 4 is operated during the time of the inspection when the backlight is turned on, the pressure in the space inside the backlight 1 is lower than the pressure in the space outside the apparatus for inspecting a backlight when turned on (usually the air pressure). Accordingly, even in the case where the optical sheets (102a to 102d) are irregularly bent and do not make close contact with each other before the inspection when the backlight is turned on, the outline of a foreign substance between optical sheets can be made less obscure, and thus the foreign substance can be easily detected.

As described above, the apparatus for inspecting a backlight when turned on according to the second embodiment can correct the irregular bending of each optical sheet due to the difference in the pressure, and thus can easily detect a foreign substance between optical sheets. Therefore, the time it takes to inspect one backlight can be shortened, and at the same time, the load during the time of inspection can be reduced. In addition, the yield can be prevented from lowering due to the oversight of a foreign substance.

Though the present invention is described on the basis of the above-described embodiments, the present invention is not limited to these embodiments and can of course be modified in various ways as long as the gist of the invention is not deviated from.

For example, the structure of the backlight to be inspected is not limited to those shown in FIGS. 1B and 1C as long as a number of optical sheets are provided and layered on top of each other, and thus the backlight may naturally have another structure.

In addition, the mechanism for allowing the work frame 3 to be movable is not limited to the rotary system as described in the first embodiment or to the upward and downward sliding system as described in the second embodiment, and thus can of course be modified if necessary.

Though in the present specification the light source has not yet been attached to the backlight to be inspected during the time of inspection when the backlight is turned on, the present invention is not limited to this and can of course be applicable to an apparatus for inspecting a backlight when turned on, on which the light source has been installed.

The present specification lists a backlight used in a liquid crystal display device as an example to which the present invention is applied. However, the present invention is not limited to this and can of course be applicable to an inspection apparatus, such as of an illumination device, having the same structure as the backlight.

What is claimed is:

1. An apparatus for inspecting an illumination device, the illumination device allowing light to be emitted from one or more light sources to the outside through a number of optical sheets that are layered on top of each other, comprising:
    a work stage on which an illumination device is placed;
    a work frame for fixing the position of the illumination device placed on the work stage; and
    a pressure reducing apparatus for making the pressure in the space inside the illumination device lower than the pressure in the space outside the apparatus for inspecting an illumination device when turned on during the inspection, wherein
    said work frame has an opening through which light from the illumination device is emitted and makes contact with the outer periphery of the illumination device and said work stage, respectively, through annular form during said inspection.

2. The apparatus for inspecting an illumination device according to claim 1, wherein the illumination device does not have a light source at the time of said inspection, and one or more light sources are attached to said work stage.

3. The apparatus for inspecting an illumination device according to claim 1, wherein the illumination device does not have a light source at the time of said inspection, and one or more light sources are attached to said work frame.

* * * * *